US011955705B2

(12) United States Patent
Su et al.

(10) Patent No.: US 11,955,705 B2
(45) Date of Patent: Apr. 9, 2024

(54) MIMO ANTENNA SYSTEM AND ELECTRONIC DEVICE USING THE SAME

(71) Applicant: Alpha Networks Inc., Hsinchu (TW)

(72) Inventors: De-Chang Su, Hsinchu (TW); Chih Jen Cheng, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 116 days.

(21) Appl. No.: 17/839,442

(22) Filed: Jun. 13, 2022

(65) Prior Publication Data

US 2023/0051848 A1 Feb. 16, 2023

(30) Foreign Application Priority Data

Aug. 2, 2021 (TW) ................................ 110128337

(51) Int. Cl.

*H01Q 1/38* (2006.01)
*H01Q 1/24* (2006.01)
*H01Q 21/30* (2006.01)

(52) U.S. Cl.

CPC ............... *H01Q 1/38* (2013.01); *H01Q 1/241* (2013.01); *H01Q 21/30* (2013.01)

(58) Field of Classification Search

CPC .......... H01Q 1/38; H01Q 1/241; H01Q 21/30; H01Q 1/2291; H01Q 1/48; H01Q 5/42; H01Q 9/40; H01Q 9/42; H01Q 21/24

See application file for complete search history.

(56) References Cited

U.S. PATENT DOCUMENTS

| | | | |
|---|---|---|---|
| 7,982,674 B2 | 7/2011 | Yang et al. | |
| 9,257,749 B2 | 2/2016 | Liou et al. | |
| 9,466,875 B2 | 10/2016 | Wang | |
| 9,653,794 B2 | 5/2017 | Lin | |
| 10,790,583 B2 * | 9/2020 | Lin | H01Q 5/307 |
| 11,502,427 B2 * | 11/2022 | Zhang | H01Q 5/385 |
| 2014/0159979 A1 * | 6/2014 | Foo | H01Q 9/0414 343/833 |

FOREIGN PATENT DOCUMENTS

| | | |
|---|---|---|
| TW | I312593 B | 7/2009 |
| TW | I631770 B | 8/2018 |
| TW | M568509 U | 10/2018 |
| TW | M571057 U | 12/2018 |

* cited by examiner

*Primary Examiner* — Seung H Lee
(74) *Attorney, Agent, or Firm* — CIPO IP Group

(57) ABSTRACT

A multi-input multi-output antenna system capable of being disposed in an electronic device and the electronic device including the antenna system have a low-frequency antenna assembly and a high-frequency antenna assembly. The low-frequency antenna assembly includes multiple low-frequency antennas that are spaced apart from each other by a distance. The high-frequency antenna assembly includes multiple high-frequency antennas that are spaced apart from each other by a distance. One of the high-frequency antennas is structured as a low-profile dish antenna and is located between the low-frequency antennas, so that the antenna system has smaller volume and height, and better isolation and radiation patterns.

16 Claims, 16 Drawing Sheets

MIMO ANTENNA SYSTEM AND ELECTRONIC DEVICE USING THE SAME

CROSS-REFERENCE TO RELATED PATENT APPLICATION

This non-provisional application claims priority to and the benefit of, under 35 U.S.C. § 119(a), Taiwan Patent Application No. 110128337, filed Aug. 2, 2021 in Taiwan. The entire content of the above identified application is incorporated herein by reference.

FIELD

The present disclosure relates to an antenna system, and more particularly to an antenna system having a low-frequency antenna assembly and a high-frequency antenna assembly having a first high-frequency antenna structured as a low-profile dish antenna and having a cavity that is located between two low-frequency antennas of the low-frequency antenna assembly.

BACKGROUND

With the rapid advancement of the wireless communication industry, wireless communication devices have been improved and upgraded continually. In the meantime, market requirements for such devices have evolved beyond a thin and compact design to also include communication quality, such as the stability of signal transmission. "Antennas" are a key element of wireless communication devices and are indispensable to the reception and transmission of wireless signals and to data transfer. The development of antenna-related technologies has been a focus of attention in the related technical fields as the wireless communication industry continues to flourish.

An antenna is an electrical conductor or electrical conduction system designed to transmit electromagnetic energy into a space or receive electromagnetic energy from a space. In order to increase data rate and channel capacity, the multi-input multi-output (MIMO) system has been widely used, which causes the number of antennas required for an electronic device to multiply. A MIMO system enables an increase in throughput in an existing bandwidth, but what follows is an increasingly small distance between multiple antennas in a limited space. The mutual coupling effect of adjacent antennas reduces isolation between the antennas and thus leads to poor radiation quality.

Generally, most of the existing methods for optimizing the radiation patterns of, and the isolation between, multiple antennas resort to polarization diversity and space diversity such that the antennas take up a considerable amount of space on the circuit board either because of the large sizes of the antennas or because the distance between each two adjacent antennas is required to be greater than one wavelength of the signals. As a result, not only is it difficult to arrange other circuits on the circuit board, but also the ideal of designing a thin and compact product is compromised. The issue to be addressed in the present disclosure is to find an effective solution to the aforesaid issues of the MIMO system and provide antenna users with better products.

SUMMARY

As there is still room for improvement for the antenna systems in conventional MIMO systems, which take up a relatively greater space, based on longtime efforts in research and experiment, the present disclosure provides a MIMO antenna system that addresses the afore-referenced issues.

One aspect of the present disclosure is directed to a MIMO antenna system that can be disposed in an electronic device, and includes a low-frequency antenna assembly and a high-frequency antenna assembly. The low-frequency antenna assembly includes a first low-frequency antenna and a second low-frequency antenna spaced apart from the first low-frequency antenna by a first distance. The high-frequency antenna assembly has a higher working frequency band than the low-frequency antenna assembly, and includes a first high-frequency antenna and a second high-frequency antenna. The first high-frequency antenna is structured as a low-profile dish antenna, located between the first low-frequency antenna and the second low-frequency antenna, and includes a metal grounding plate and a metal disc. The metal grounding plate can be fixed on a circuit board in the electronic device, and has a cavity concavely formed on a top surface thereof. The metal disc corresponds in position to the cavity and has a signal feed-in terminal provided on a central area of the metal disc and not electrically connected to the metal grounding plate. The second high-frequency antenna is spaced apart from the first high-frequency antenna by a second distance and located between the first low-frequency antenna and the second low-frequency antenna. Accordingly, the antenna system according to the present disclosure has smaller volume and height, and better isolation and radiation patterns.

Another aspect of the present disclosure is directed to an electronic device including a shell, a circuit board located in the shell, and the afore-referenced antenna system that is located in the shell and can be electrically connected to the circuit board.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

Figure 1:
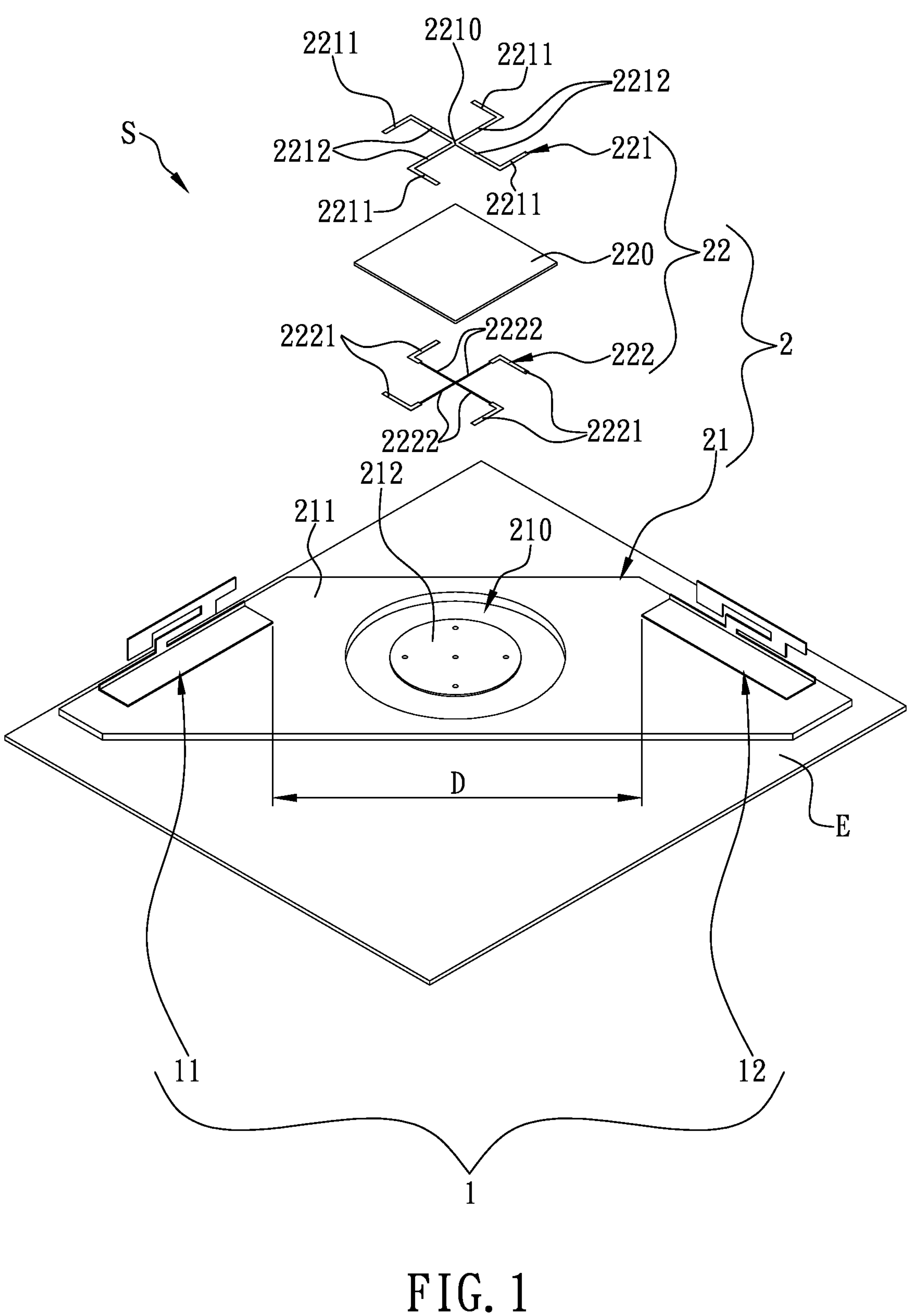
FIG. 1 is a perspective view of an antenna system according to certain embodiments of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The accompanying drawings are schematic and may not have been drawn to scale. The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, materials, objects, or the like, which are for distinguishing one component/material/object from another one only, and are not intended to, nor should be construed to impose any substantive limitations on the components, materials, objects, or the like. Directional terms (e.g., "front", "rear", "left", "right", "upper/top" and/or "lower/bottom") are explanatory only and are not intended to be restrictive of the scope of the present disclosure.

Certain aspects of the present disclosure are directed to a MIMO antenna system and an electronic device using the same. An antenna system S can be integrated in an electronic device R that has wireless communication function, such as a wireless router, wireless access point, personal computer, laptop, etc. That is, any electronic device that supports MIMO communication technique falls within the scope of electronic device R defined in the present disclosure. The antenna system S is configured to be electrically connected to a circuit board E and be connected to a wireless communication module on the circuit board. E so as to provide the wireless signals received by the antenna system S to the wireless communication module for processing or send out the wireless signals transmitted to the antenna system S by the wireless communication module. The antenna system S includes a low-frequency antenna assembly 1 and a high-frequency antenna assembly 2. The low-frequency antenna assembly 1 includes a plurality of low-frequency antennas, and the high-frequency antenna assembly 2 includes a plurality of high-frequency antennas. It should be pointed out that "low-frequency" and "high-frequency" are merely relative terms used between the two antenna assemblies. That is, it means only that the working frequency/frequencies of the low-frequency antenna assembly 1 (e.g., 2 GHz and 5 GHz) is/are lower than the working frequency/frequencies of the high-frequency antenna assembly 2 (e.g., 6 GHz).

Figure 2:
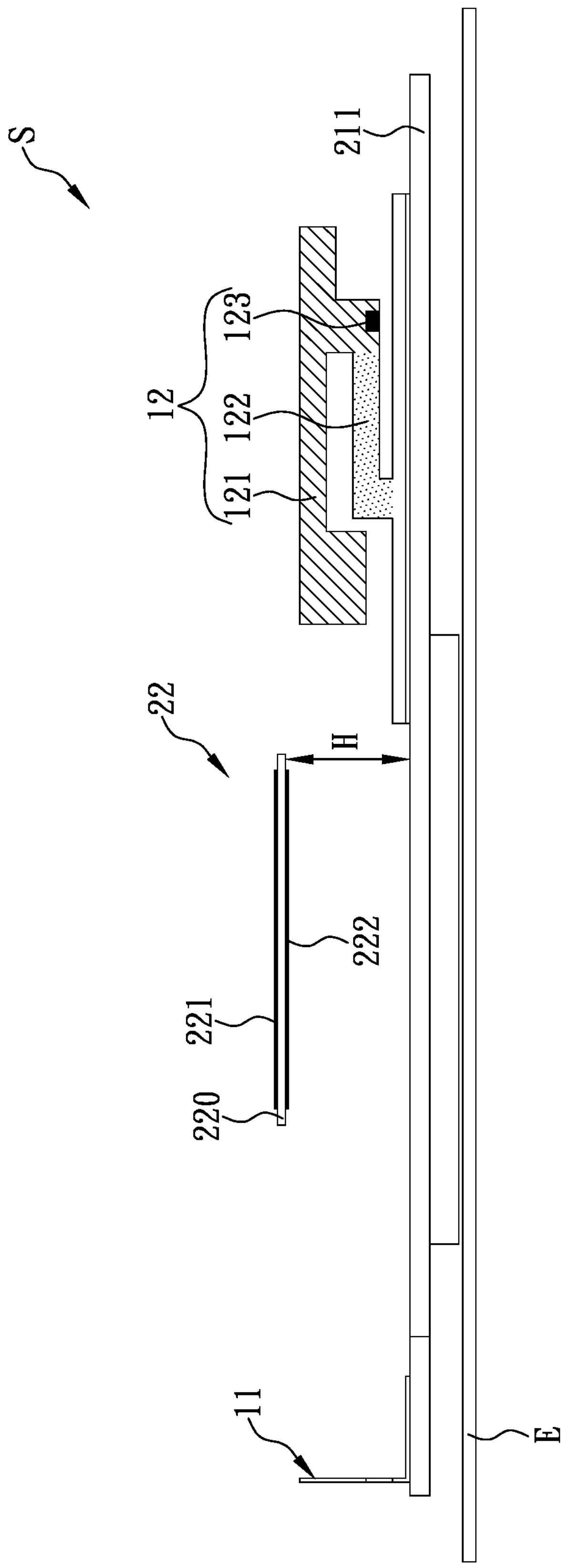
FIG. 2 is a lateral view of the antenna system according to certain embodiments of the present disclosure.
Figure 3A:
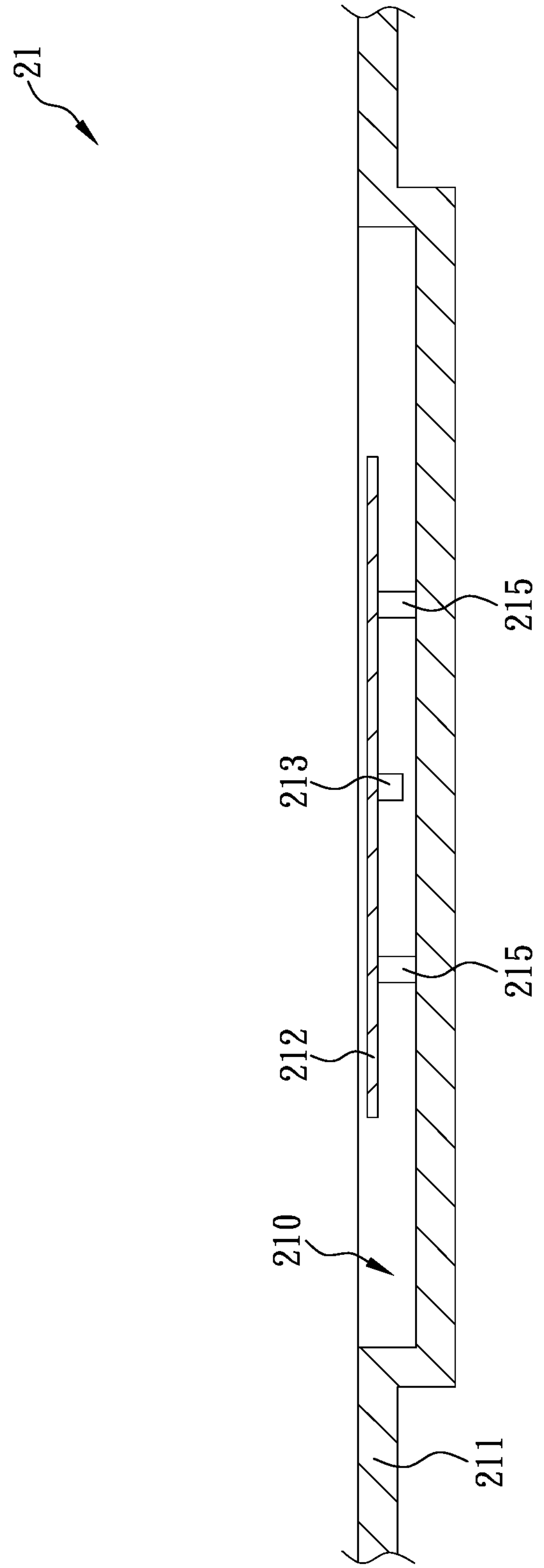
FIG. 3A is a cross-sectional view of a first high-frequency antenna according to certain embodiments of the present disclosure.
Figure 3B:
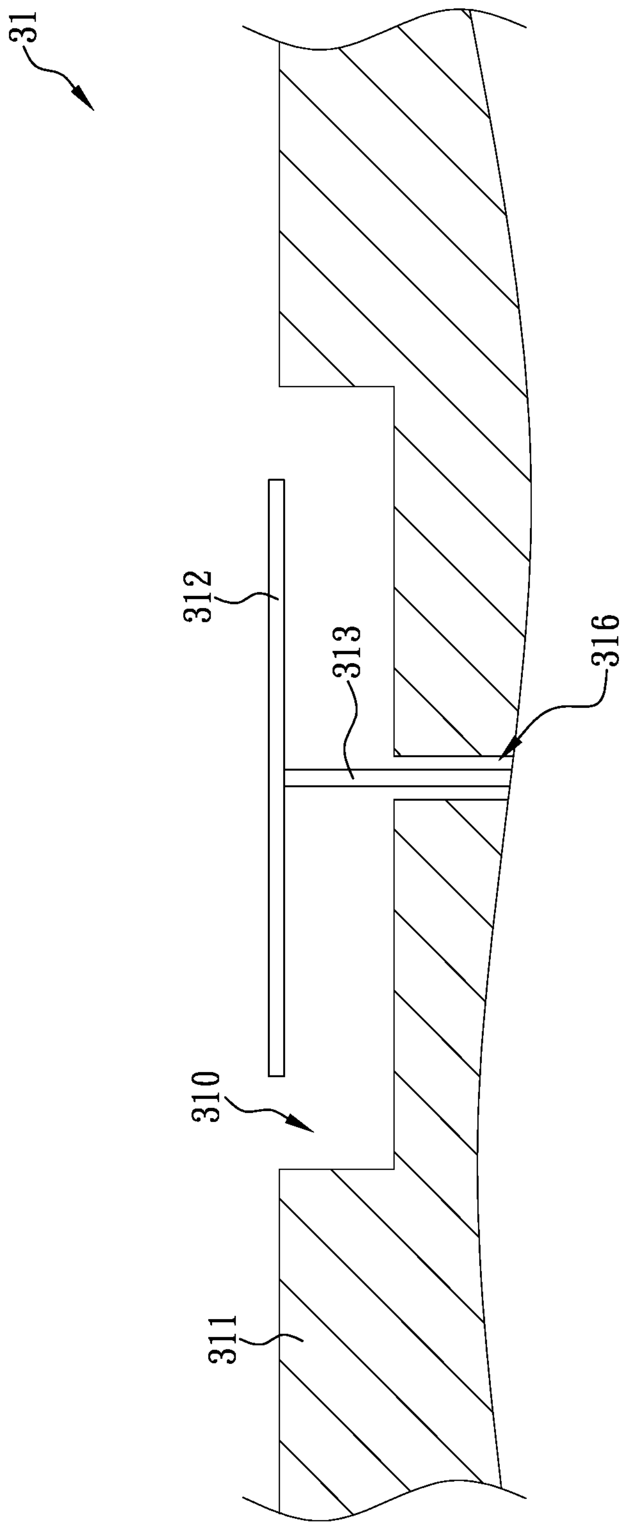
FIG. 3B is a cross-sectional view of a first high-frequency antenna according to certain embodiments of the present disclosure.

In certain embodiments, referring to FIG. 1 and FIG. 2, the low-frequency antenna assembly 1 has a first low-frequency antenna 11 and a second low-frequency antenna 12. Both the first low-frequency antenna 11 and the second low-frequency antenna 12 are structured as planar inverted-F antennas (PIM) and are 2 GHz/5 GHz dual-frequency antennas. In certain embodiments, the first low-frequency antenna 11 and the second low-frequency antenna 12 are identical in shape and structure, and the second low-frequency antenna 12, as well as the first low-frequency antenna 11, includes an antenna radiation portion 121 (i.e., the hatched area in FIG. 2), a grounding portion 122 (i.e., the dotted area in FIG. 2), and a signal feed-in terminal 123 (with the feed line omitted from FIG. 2). As shown in FIG. 1, the first low-frequency antenna 11 and the second low-frequency antenna 12 are spaced apart by a distance D and can be placed at an angle of 90 degrees with respect to each other. In certain embodiments, the distance D is 150 mm, which is approximately 1.2 times the wavelength $\lambda_0$ of 2.4 GHz (low-frequency) electromagnetic waves, wherein: $\lambda_0$=C/fc, C is the speed of light (3'40$^8$ m/s), and fc is the frequency (2.4 GHz) of the electromagnetic waves. In certain embodiments, the antenna structures of the first and the second low-frequency antennas 11 and 12 (e.g., the shapes and locations of the antenna radiation portions 121, of the grounding portions 122, and of the signal feed-in terminals 123) and the angle and distance D between the two low-frequency antennas are not limited to those depicted in FIG. 1 and may be adjusted to meet actual product requirements.

The high-frequency antenna assembly 2 can be located within the low-frequency antenna assembly 1. In certain embodiments, referring to FIG. 1 to FIG. 3A, the high-frequency antenna assembly 2 has a first high-frequency antenna 21 and a second high-frequency antenna 22. The first high-frequency antenna 21 is located between the first low-frequency antenna 11 and the second low-frequency antenna 12, is structured as a low-profile dish antenna, and includes a metal grounding plate 211 and a metal disc 212. The metal grounding plate 211 can be fixed on the circuit board E, electrically connected to a grounding circuit on the circuit board E, and therefore function as the grounding terminal of the first high-frequency antenna 21. The metal grounding plate 211 also serves as an antenna carrier plate. The top surface of the metal grounding plate 211 is concavely formed with a cavity 210, which lies in the distance D between the first low-frequency antenna 11 and the second low-frequency antenna 12. In certain embodiments, the first high-frequency antenna 21 works in the 6 GHz frequency band, and the cavity 210 may be formed at the metal grounding plate 211 by embossing so as to have a depth of 2.2 mm (or approximately 0.05 times the wavelength $\lambda_0$ of 6 GHz electromagnetic waves, wherein: $\lambda_0$=C/fc, and fc is the frequency (6 GHz) of the electromagnetic waves) and occupy a relatively small amount of space, which is a feature of a low-profile antenna. The cavity 210 has a diameter of 43 mm (or approximately 0.93 times the wavelength $\lambda_0$ of 6.5 GHz electromagnetic waves, wherein: $\lambda_0$=C/fc, and fc is the frequency (6.5 GHz) of the electromagnetic waves). As the metal grounding plate 211 can serve as an antenna carrier plate, the first low-frequency antenna 11 and the second low-frequency antenna 12 are electrically connected to a portion of the top surface of the metal grounding plate 211 that is not occupied by the cavity 210, with each of the first and the second low-frequency antennas 11 and 12 spaced apart from the cavity 210 by a distance of 17 mm (or approximately 0.31 times the wavelength $\lambda_0$ of 5 GHz electromagnetic waves, wherein: $\lambda_0$=C/fc, and fc is the frequency (5 GHz) of the electromagnetic waves).

In certain embodiments, with continued reference to FIG. 1 to FIG. 3A, the metal disc 212 corresponds to the cavity 210 and has a central area provided with a signal feed-in terminal 213. The signal feed-in terminal 213 is not electrically connected to the metal grounding plate 211. In certain embodiments, the first high-frequency antenna 21 further includes at least one supporting post 215, the top end of each supporting post 215 is connected to the metal disc 212, and the bottom end of each supporting post 215 is connected to the bottom surface of the cavity 210 such that the metal disc 212 is suspended with respect to the cavity 210 (i.e., the bottom surface of the metal disc 212 is not in direct contact with the bottom surface of the cavity 210). However, the configuration of the first high-frequency antenna is not limited to that depicted in FIG. 3A. In certain embodiments, referring to FIG. 313, a metal grounding plate 311 is concavely provided with a cavity 310 whose bottom surface is formed with a through hole 316, and the bottom end of a signal feed-in terminal 313 of a metal disc 312 extends through the through hole 316 and is fixed on a circuit board or another element without touching the wall of the cavity 310. Thus, the metal disc 312 is suspended above the cavity 310, and a first high-frequency antenna 31 that does not require an additional supporting post is formed thereby.

Referring to FIG. 1 and FIG. 2, the second high-frequency antenna 22 can be located above the top side of the first high-frequency antenna 21 and is spaced apart from the first high-frequency antenna 21 by a distance H. In certain embodiments, the second high-frequency antenna 22 works in the 6 GHz frequency band and is 15 mm (or approximately 0.33 times the wavelength $\lambda_0$ of 6.5 GHz electromagnetic waves, wherein $\lambda_0$=C/fc, and fc is the frequency (6.5 GHz) of the electromagnetic waves) above the first high-frequency antenna 21. The second high-frequency antenna 22 is structured as a horizontally polarized antenna and includes a substrate 220, a first antenna unit 221, and a second antenna unit 222. The first antenna unit 221 is located on the top side of the substrate 220 while the second antenna unit 222 is located on the bottom side of the substrate 220. In certain embodiments, the first antenna unit 221 includes four first radiation terminals 2211 and four first connecting lines 2212. Each first radiation terminal 2211 can be adjacent to one of the four sides of the substrate 220, and each first connecting line 2212 has one end connected to one of the first radiation terminals 2211 and the other end connected to the other first connecting lines 2212, with a signal feed-in terminal 2210 provided at the junction of the four first connecting lines 2212. In certain embodiments, the signal feed-in terminal 2210 is not necessarily located at the aforesaid junction, and can be at a position that provides electrical connection with each first radiation terminal 2211.

In certain embodiments, with continued reference to FIG. 1 and FIG. 2, the second antenna unit 222 includes four second radiation terminals 2221 and four second connecting lines 2222. Each second radiation terminal 2221 is adjacent to one of the four sides of the substrate 220, and each second connecting line 2222 has one end connected to one of the second radiation terminals 2221 and the other end connected to the other second connecting lines 2222. Moreover, the position of each second connecting line 2222 on the substrate 220 corresponds to the position of one of the first connecting lines 2212. The first radiation terminals 2211 and the second radiation terminals 2221, therefore, can function as transmitting antennas to each receive a radio-frequency signal from the signal feed-in terminal 2210 in order for the second high-frequency antenna 22 to produce a radiation pattern, or the first radiation terminals 2211 and the second radiation terminals 2221 can function as receiving antennas to each receive a wireless signal, thereby creating a wireless communication channel. In certain embodiments, the configurations of the first radiation terminals 2211 and of the second radiation terminals 2221 are not limited to those depicted in FIG. 1 and may be changed according to product requirements. Any circuit elements that can form a horizontally polarized antenna can be used to implement the second high-frequency antenna in the present disclosure.

Figure 4A:
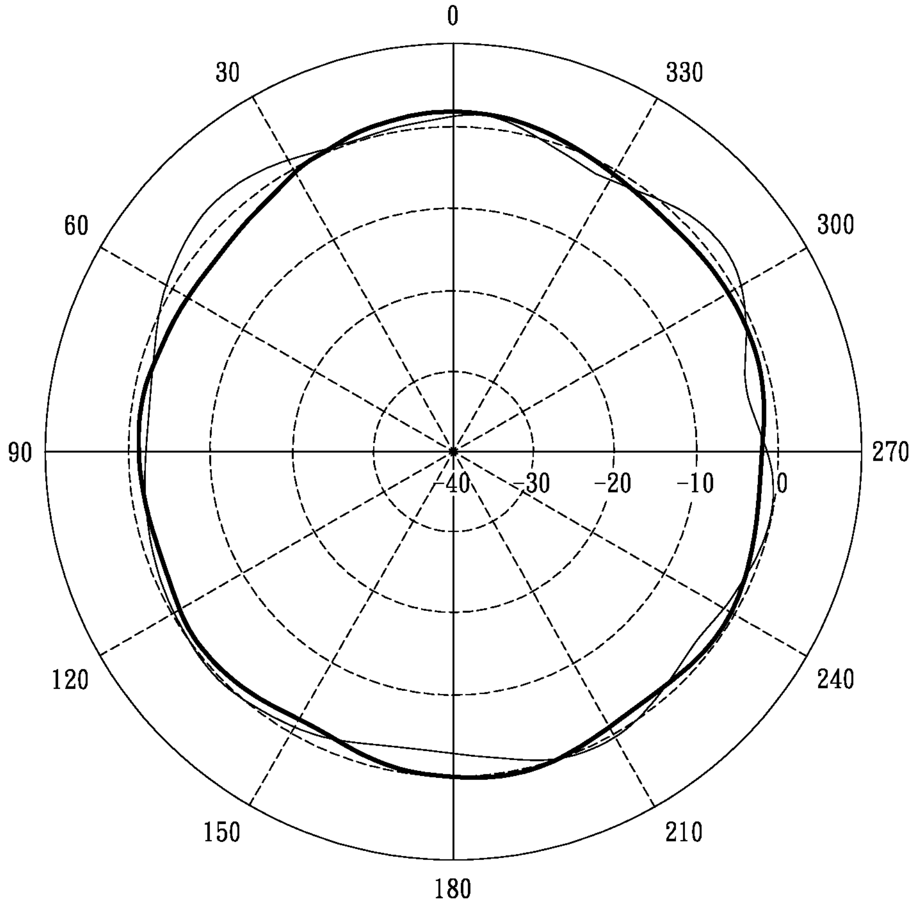
FIGS. 4A-4C are X-Y plane radiation pattern diagrams of an antenna system according to certain embodiments of the present disclosure.
Figure 4B:
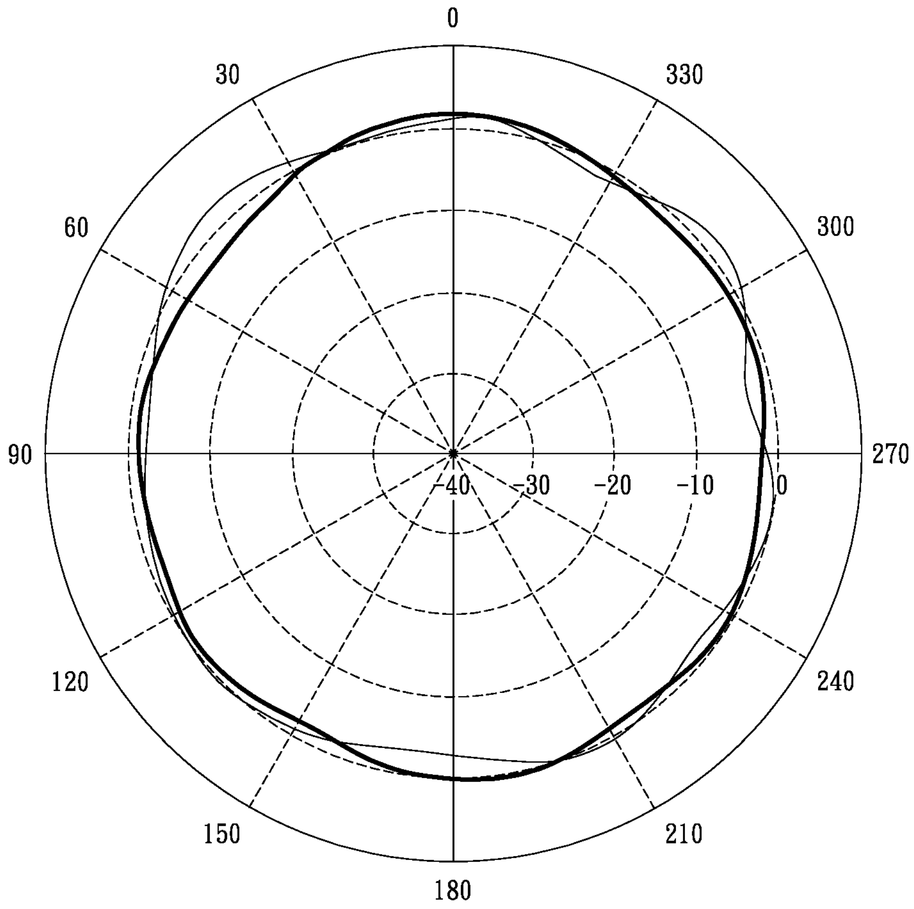
Figure 4C:
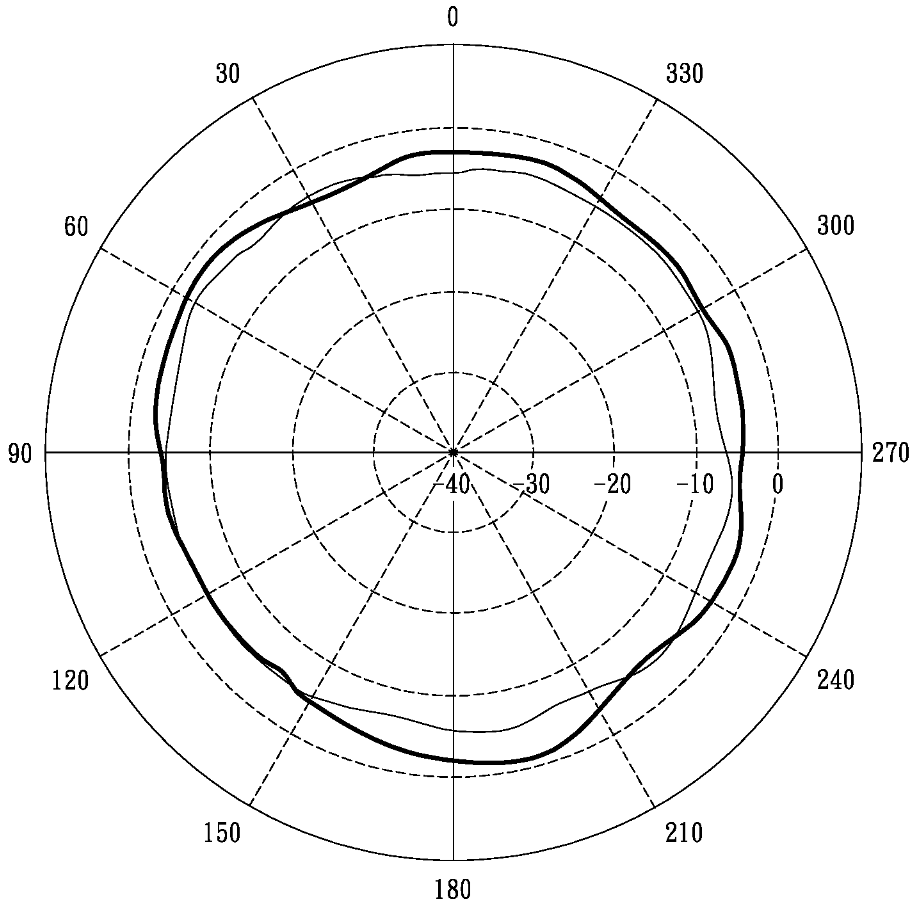

In certain embodiments, it is so designed that the antenna system S works in the Wi-Fi 6E frequency band, with the low-frequency antenna assembly 1 working in the 2 GHz/5 GHz frequency band, and the high-frequency antenna assembly 2 working in the 6 GHz frequency band as a backhaul. The high-frequency antenna assembly 2 is relatively susceptible to environmental impacts and is therefore placed in a central area of the space where the antennas of the antenna system S are arranged, i.e., between the first and the second low-frequency antennas 11 and 12, so as to achieve polarization diversity through the first high-frequency antenna 21 and the second high-frequency antenna 22, which enhances antenna isolation, and to achieve space diversity by disposing the first and the second low-frequency antennas 11 and 12 at substantially opposite positions along the sides of the metal grounding plate 211 and at an angle of 90 degrees or substantially 90 degrees with respect to each other to optimize isolation. Accordingly, the antenna system S takes up much less (about 50% less) space than the conventional antenna systems. As to radiation patterns, experiment results show that the 2 GHz radiation patterns of the first and the second low-frequency antennas 11 and 12 are omnidirectional in the X-Y plane (as shown in FIG. 4A, in which the thick line represents the test result of the first low-frequency antenna 11, and the thin line, of the second low-frequency antenna 12), that the 5 GHz radiation patterns of the first and the second low-frequency antennas 11 and 12 are also omnidirectional in the X-Y plane (as shown in FIG. 4B, in which the thick line represents the test result of the first low-frequency antenna 11, and the thin line, of the second low-frequency antenna 12), that the 6 GHz radiation patterns of the first and the second high-frequency antennas 21 and 22 are omnidirectional in the X-Y plane too (as shown in FIG. 4C, in which the thick line represents the test result of the first high-frequency antenna 21, and the thin line, of the second high-frequency antenna 22), and that isolation between the antennas including the first and the second high-frequency antennas 21 and 22 and the first and the second low-frequency antennas 11 and 12 is 20 dB or above, as shown in Table 1 as follows.

TABLE 1

| Antenna Frequency | 2 GHz | 5 GHz | 6 GHz |
|---|---|---|---|
| 2 GHz | 25 dB | 25 dB | 45 dB |
| 5 GHz | 25 dB | 25 dB | 23 dB |
| 6 GHz | 45 dB | 23 dB | 22 dB |

Figure 5:
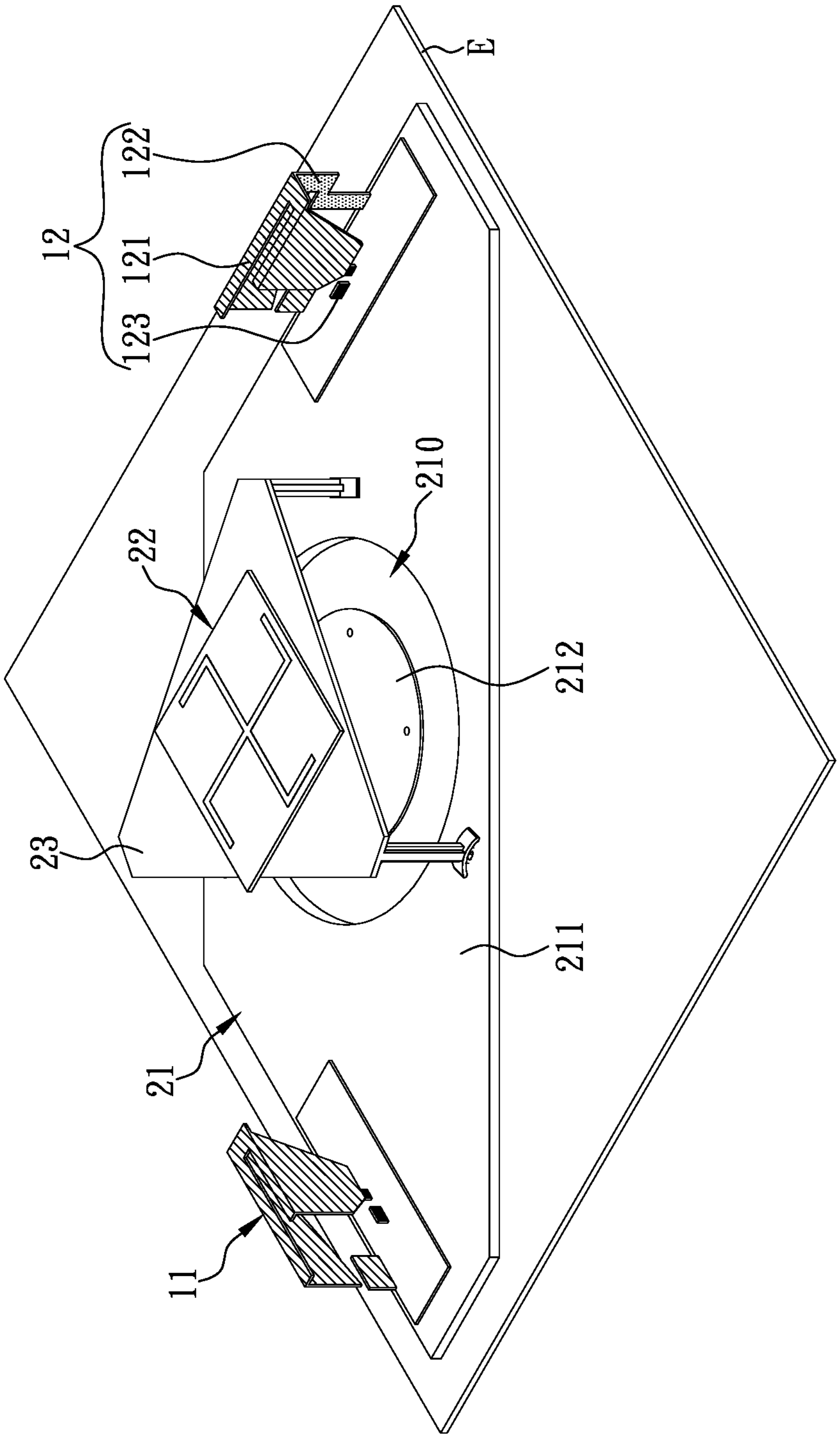
FIG. 5 is a perspective view of an antenna system according to certain embodiments of the present disclosure.
Figure 6:
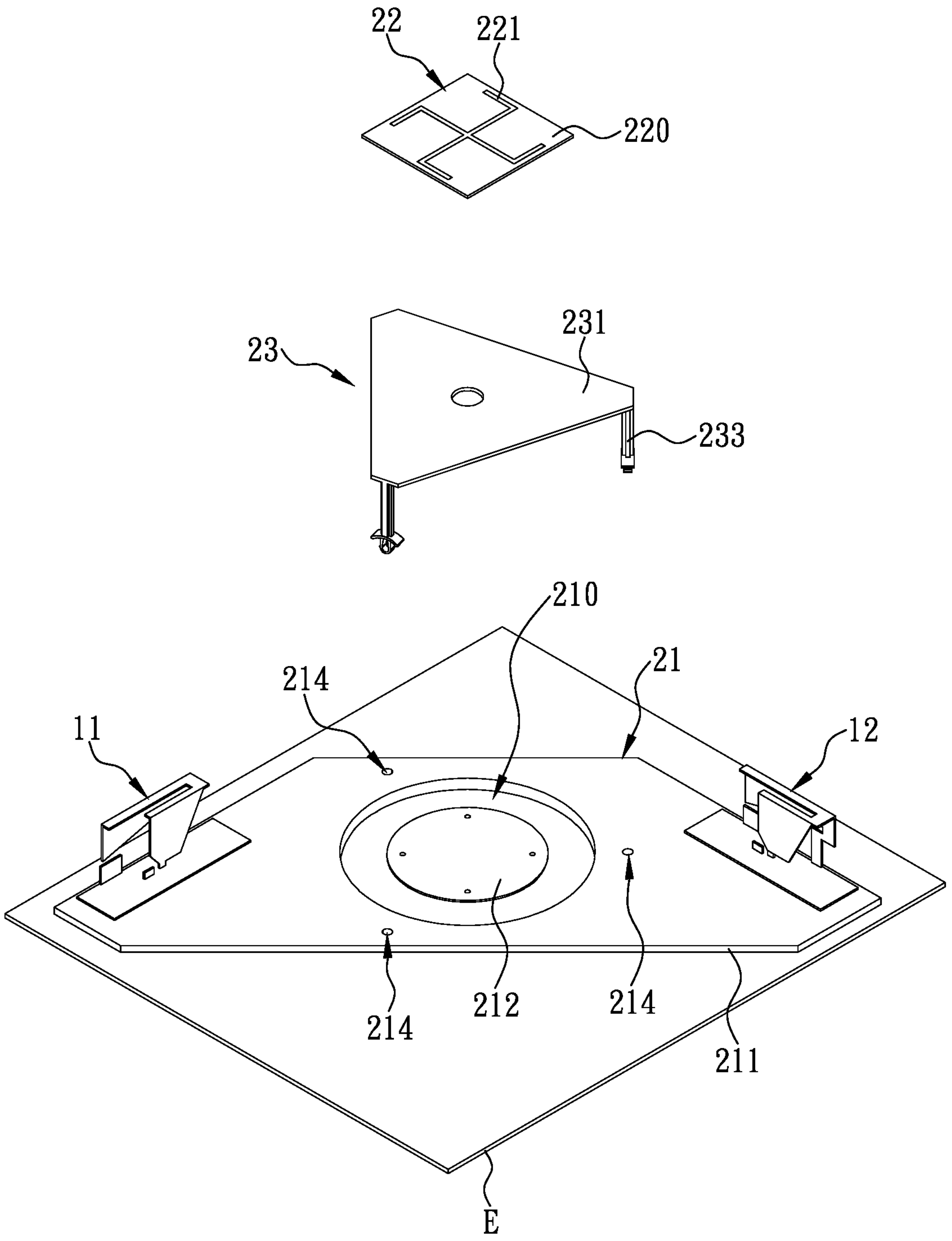
FIG. 6 is an exploded view of an antenna system according to certain embodiments of the present disclosure.

The structural arrangement to keep the second high-frequency antenna 22 away from the first high-frequency antenna 21 by the distance H is further explained below. Referring to FIG. 5 and FIG. 6, in certain embodiments, the second high-frequency antenna 22 is mounted on a mechanical member 23, and the portion of the mechanical member 23 that is in contact with the second high-frequency antenna 22 is made of an insulating material. The mechanical member 23 includes a carrier plate 231 and at least one carrying post 233. Each carrying post 233 is connected to the carrier plate 231 at the top end and is connected to the metal grounding plate 211 at the bottom end. In certain embodiments, referring to FIG. 6, the top end of each carrying post 233 is integrally formed with the carrier plate 231, and the bottom end of each carrying post 233 is engaged in an engaging hole 214 formed in the metal grounding plate 211. The second high-frequency antenna 22 can be mounted on the top surface of the carrier plate 231 so as to be spaced apart from the first high-frequency antenna 21 by a distance H. For example, the substrate 220 may be fixed on the carrier plate 231 adhesively or by other mechanisms.

Figure 7:
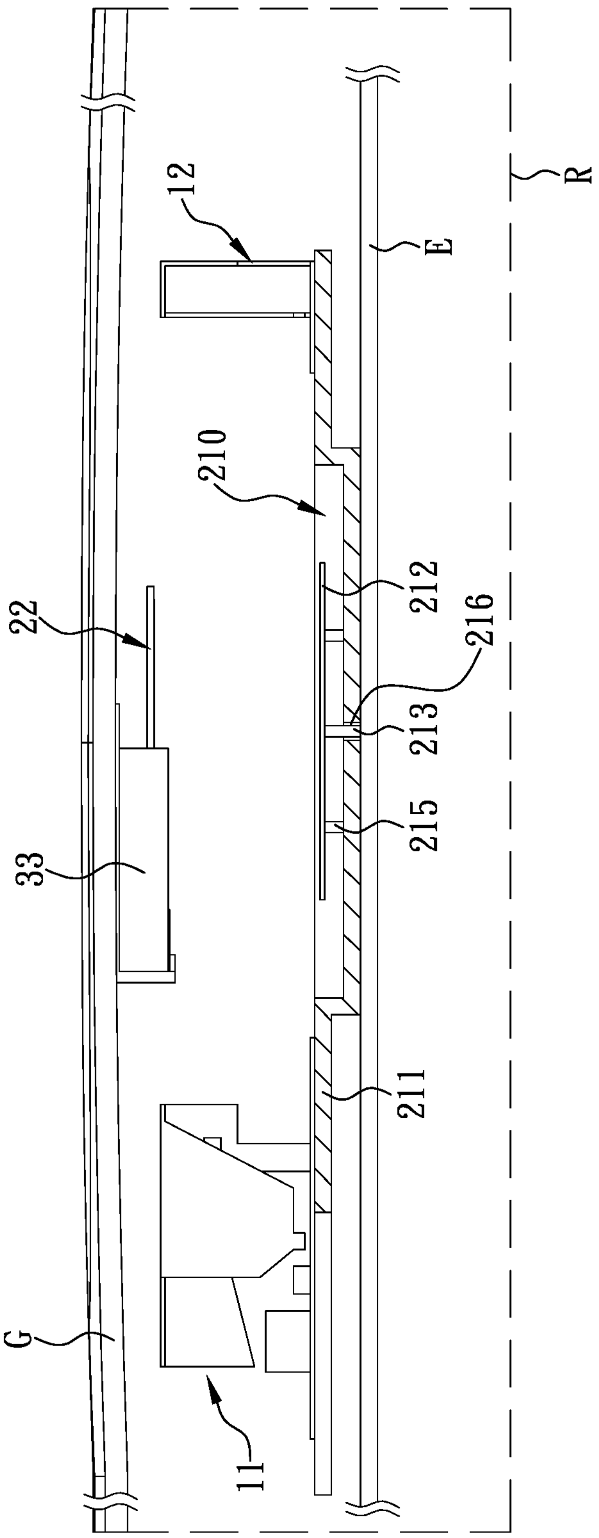
FIG. 7 is a cross-sectional view of an antenna system according to certain embodiments of the present disclosure.
Figure 8:
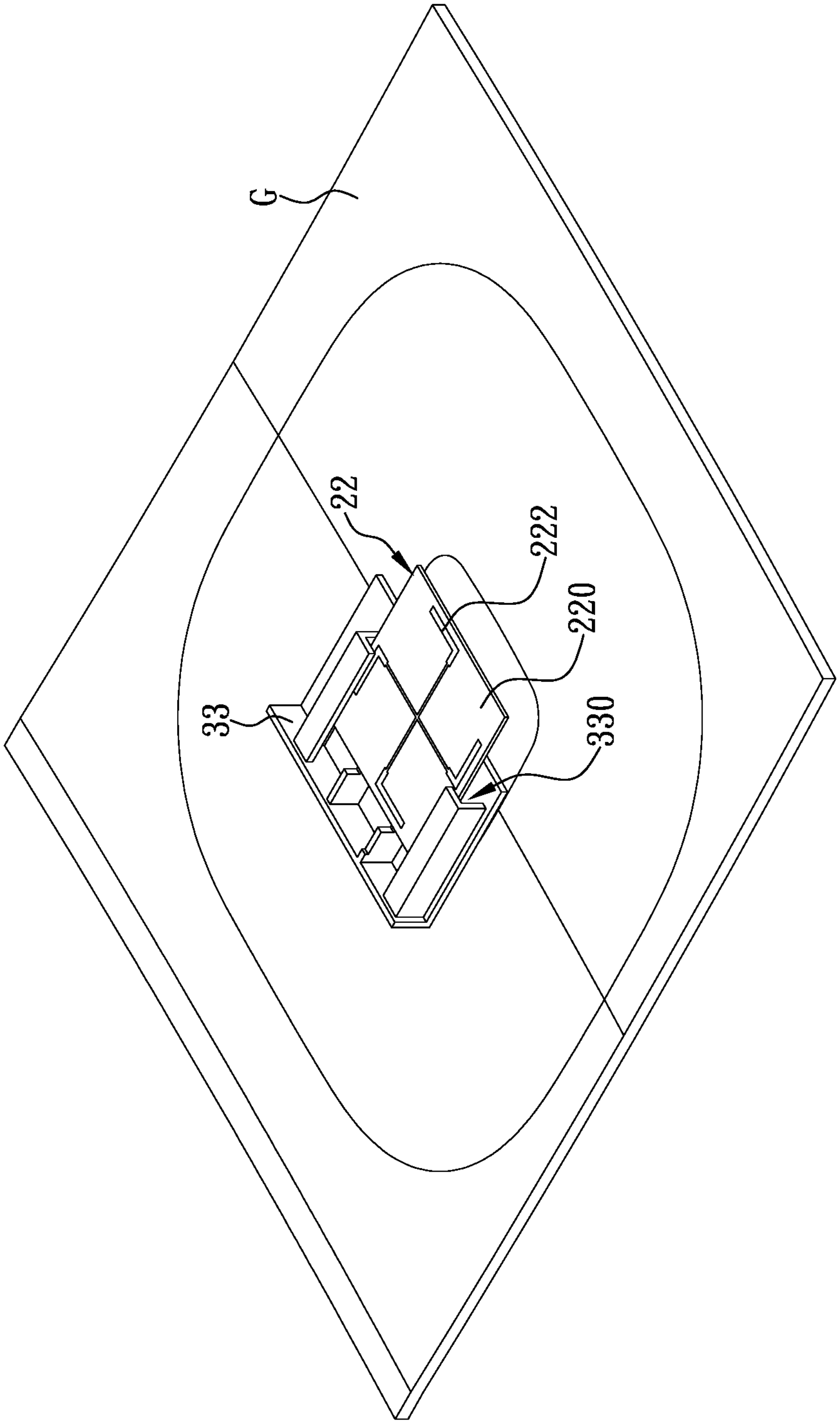
FIG. 8 is a perspective view of a second high-frequency antenna and a mechanical member according to certain embodiments of the present disclosure.

The main function of the mechanical member in the present disclosure is to secure the second high-frequency antenna 22 in place and prevent the second high-frequency antenna 22 from direct contact with the first high-frequency antenna 21. Therefore, the actual configuration of the mechanical member is not limited to the configurations disclosed herein, and as long as the aforesaid function can be served, an element in another configuration falls in the scope of the mechanical member defined in the present disclosure. Referring to FIG. 7 and FIG. 8, in certain embodiments, which demonstrates another structure of the mechanical member, a mechanical member 33 can be fixed on the inner surface of a housing G of an electronic device R, with the circuit board E facing the inner surface of the housing G. A surface of the mechanical member 33, for example, the top surface thereof as shown in FIG. 7, can be connected to the inner surface of the housing G, and a lateral side of the mechanical member 33 can be formed with an inward-facing insertion space 330. The second high-frequency antenna 22 can be inserted into the insertion space 330 and thus mounted in the mechanical member 33 in order for the mechanical member 33 to keep the distance II between the second high-frequency antenna 22 and the first high-frequency antenna 21. In certain embodiments, referring to FIG. 7, the configuration of the first high-frequency antenna can be a combination of those in certain embodiments described above, the bottom surface of the cavity 210 can be formed with a through hole 216, the signal feed-in terminal 213 of the metal disc 212 can be extended through the through hole 216 without touching the wall of the cavity 210, and the supporting posts 215 can be provided between the metal disc 212 and the bottom side of the cavity 210 to ensure that the metal disc 212 is stably disposed in the cavity 210. As product requirements vary, so may the configurations of the first and the second low-frequency antennas 11 and 12 in the present disclosure, for example, in FIG. 5, in which the first low-frequency antenna 11 and the second low-frequency antenna 12 can be identical in shape and structure, the second low-frequency antenna 12 includes an antenna radiation portion 121 (i.e., the hatched area in FIG. 5), a grounding portion 122 (i.e., the dotted area in FIG. 5), and a signal feed-in terminal 123 (with the feed line omitted from FIG. 5). In certain embodiments, therefore, as long as a first low-frequency antenna and/or a second low-frequency antenna have the structure and properties of at least one PIFA antenna, they fall within the scope of the first and the second low-frequency antennas 11 and 12 of the present disclosure.

Figure 9:
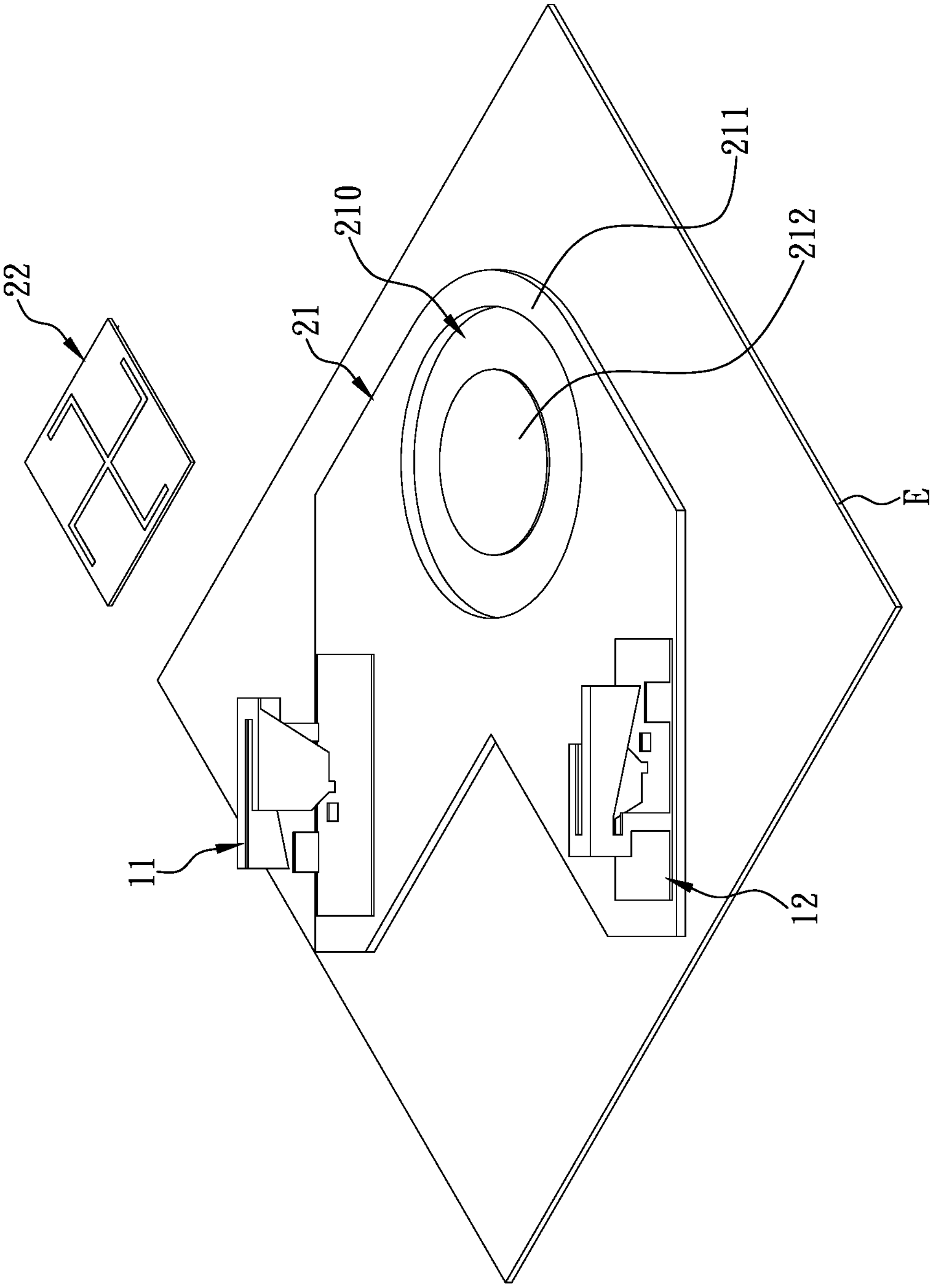
FIG. 9 is a perspective view of an antenna system according to certain embodiments of the present disclosure.

As previously mentioned, the first high-frequency antenna can be located between the first low-frequency antenna 11 and the second low-frequency antenna 12. This statement refers mainly to the positions of the cavity 210 and of the metal disc 212, and yet the cavity 210 and the metal disc 212 are not necessarily located in the area extending linearly between the first and the second low-frequency antennas 11 and 12 as shown in FIG. 1. In certain embodiments, referring to FIG. 9, the cavity 210 and the metal disc 212 can be shifted away from the area extending linearly between the first and the second low-frequency antennas 11 and 12. Therefore, as long as the first low-frequency antenna 11 and the second low-frequency antenna 12 are located respectively on two opposite lateral sides of the cavity 210 and hence of the metal disc 212, the foregoing condition that "the high-frequency antenna assembly is located within the low-frequency antenna assembly" or "the first high-frequency antenna is located between the first low-frequency antenna and the second low-frequency antenna" is satisfied.

Figure 10:
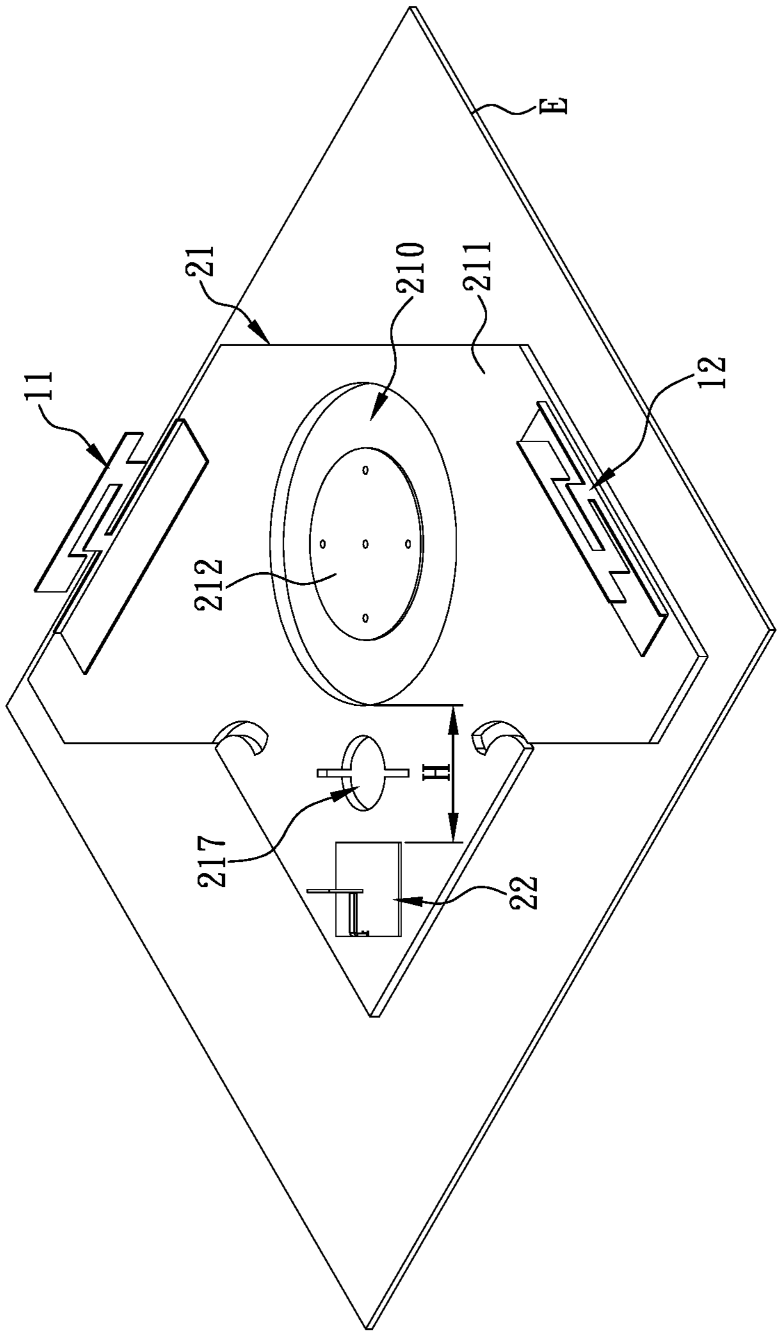
FIG. 10 is a perspective view of an antenna system according to certain embodiments of the present disclosure.

In certain embodiments, referring to FIG. 10, the second high-frequency antenna 22 is structured as a PIFA antenna, is electrically connected to a portion of the top surface of the metal grounding plate 211 that is not occupied by the cavity 210, and is spaced apart from the first high-frequency antenna 21 by the distance H. In addition, an aperture 217 can be formed on the metal grounding plate 211 at a position in the distance H between the first and the second high-frequency antennas 21 and 22 and is designed to enhance antenna isolation. In certain embodiments, the distance H is 18 mm, which is approximately 0.39 times the wavelength $\lambda_0$ of 6.5 GHz electromagnetic waves, wherein $\lambda_0$=C/fc, and fc is the frequency (6.5 GHz) of the electromagnetic waves. Thus, the antenna system takes up less space, particularly in height, than the conventional antenna systems and has good isolation and desirable radiation patterns.

Figure 11:
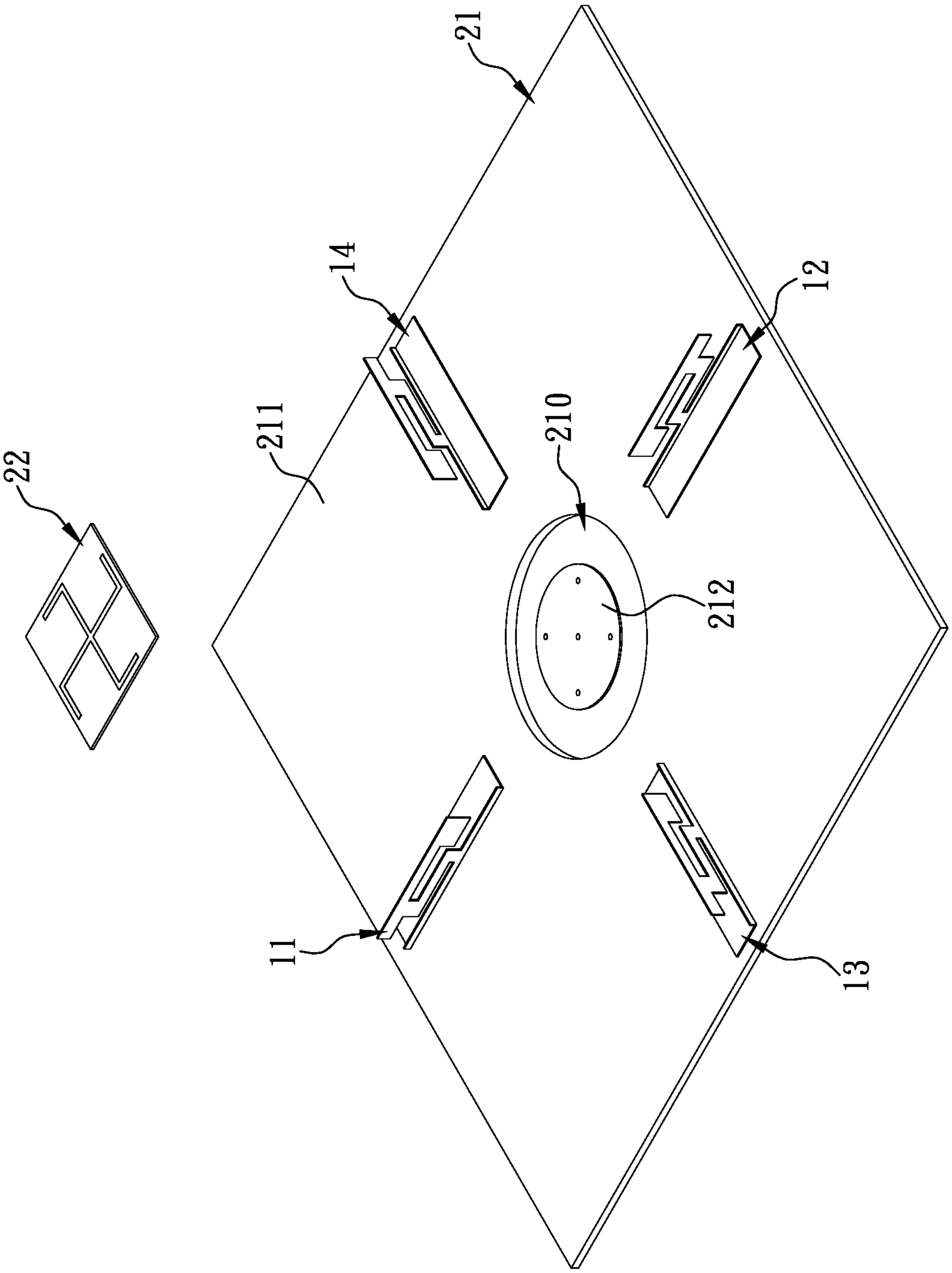
FIG. 11 is a perspective view of an antenna system according to certain embodiments of the present disclosure.

The antenna system according to the present disclosure may have other variation in order to meet actual product requirements. In certain embodiments, referring to FIG. 11, the low-frequency antenna assembly has four low-frequency antennas, namely a first low-frequency antenna 11, a second low-frequency antenna 12, a third low-frequency antenna 13, and a fourth low-frequency antenna 14. The low-frequency antennas 11 to 14 are respectively adjacent to the four sides of the metal grounding plate 211, and the cavity 210 and the metal disc 212 are in the area surrounded by the low-frequency antennas 11 to 14, with the second high-frequency antenna 22 located above the metal disc 212.

Figure 12:
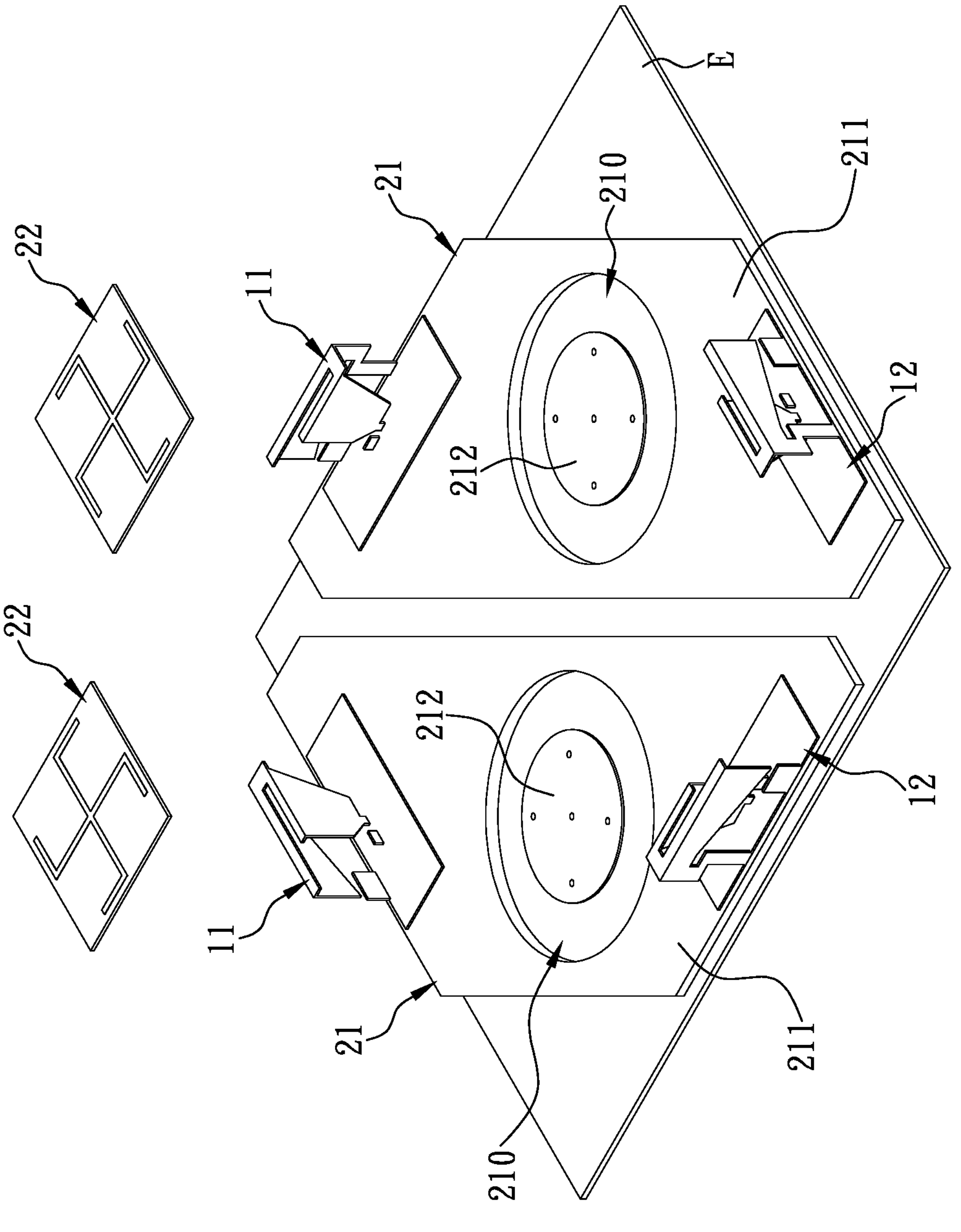
FIG. 12 is a perspective view of an antenna system according to certain embodiments of the present disclosure.
Figure 13:
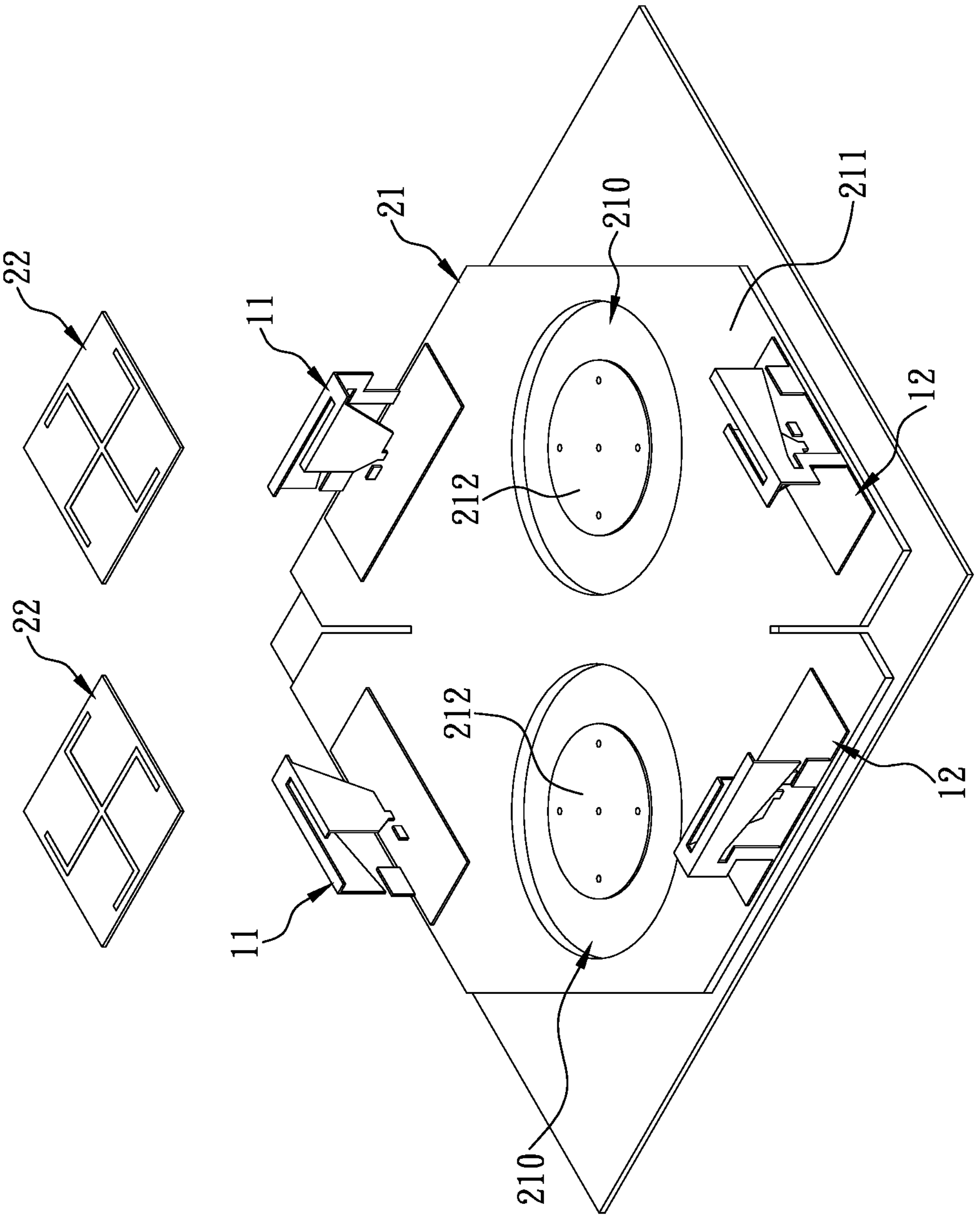
FIG. 13 is a perspective view of an antenna system according to certain embodiments of the present disclosure.

In certain embodiments, referring to FIG. 12, the antenna system includes two low-frequency antenna assemblies and two high-frequency antenna assemblies. Each of the two low-frequency antenna assemblies has a first low-frequency antenna 11 and a second low-frequency antenna 12, and each of the two high-frequency antenna assemblies has a first high-frequency antenna 21 and a second high-frequency antenna 22. The metal grounding plates 211 of the two first high-frequency antennas 21 can be provided on the circuit board E and are spaced apart from each other. In certain embodiments, however, the metal grounding plates 211 of the two first high-frequency antennas 21 are joined to form a single unit, as shown in FIG. 13.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A multi-input multi-output antenna system configured to be disposed in an electronic device and comprising:

- a low-frequency antenna assembly comprising a first low-frequency antenna and a second low-frequency antenna spaced apart from the first low-frequency antenna by a first distance; and
- a high-frequency antenna assembly having a higher working frequency band than the low-frequency antenna assembly, and comprising:
  - a first high-frequency antenna that is a low-profile dish antenna, located between the first low-frequency antenna and the second low-frequency antenna, and comprising:
    - a metal grounding plate configured to be fixed on a circuit board in the electronic device and having a cavity concavely formed on a top surface thereof, and
    - a metal disc corresponding in position to the cavity and having a signal feed-in terminal provided on a central area of the metal disc and not electrically connected to the metal grounding plate; and
  - a second high-frequency antenna spaced apart from the first high-frequency antenna by a second distance and located between the first low-frequency antenna and the second low-frequency antenna.

2. The antenna system according to claim 1, wherein the second high-frequency antenna is a horizontally polarized antenna and located above a top side of the first high-frequency antenna to be spaced apart from the first high-frequency antenna by the second distance.

3. The antenna system according to claim 1, further comprising a mechanical member, wherein the second high-frequency antenna is mountable on the mechanical member and spaced apart from the first high-frequency antenna by the second distance via the mechanical member, and a portion of the mechanical member configured to be in contact with the second high-frequency antenna is made of an insulating material.

4. The antenna system according to claim 3, wherein the mechanical member is connected to the metal grounding plate.

5. The antenna system according to claim 3, wherein the mechanical member comprises a carrier plate and at least one carrying post having a top end connected to the carrier plate and a bottom end connected to the metal grounding plate, and the second high-frequency antenna is mountable to a top surface of the carrier plate.

6. The antenna system according to claim 3, wherein the mechanical member is configured to be fixed on an inner surface of a housing of the electronic device that faces the circuit board.

7. The antenna system according to claim 6, wherein a top surface of the mechanical member is connectable to the inner surface of the housing, a lateral side of the mechanical member is formed with an inward-facing insertion space, and the second high-frequency antenna is configured to be inserted into the insertion space to be mounted in the mechanical member.

8. The antenna system according to claim 1, wherein the second high-frequency antenna comprises a substrate, a first antenna unit configured to be located on a top side of the substrate, and a second antenna unit configured to be located on a bottom side of the substrate.

9. The antenna system according to claim 8, the first low-frequency antenna and the second low-frequency antenna are planar inverted-F antennas.

10. The antenna system according to claim 1, wherein the second high-frequency antenna is a planar inverted-F antenna and configured to be electrically connected to a portion of the top surface of the metal grounding plate that is not occupied by the cavity, and an aperture is formed on the metal grounding plate at a position in the second distance between the first and the second high-frequency antennas.

11. The antenna system according to claim 10, the first low-frequency antenna and the second low-frequency antenna are planar inverted-F antennas.

12. The antenna system according to claim 1, wherein the first high-frequency antenna comprises at least one supporting post having a top end configured to be connected to the metal disc and a bottom end configured to be connected to a bottom surface of the cavity.

13. The antenna system according to claim 12, wherein a portion of the top surface of the metal grounding plate that is not occupied by the cavity is configured to be electrically connected to the low-frequency antenna assembly.

14. The antenna system according to claim 1, wherein the signal feed-in terminal extends through a bottom surface of the cavity without touching a wall of the cavity, and the metal disc is suspended above the cavity.

15. The antenna system according to claim 14, wherein a portion of the top surface of the metal grounding plate that is not occupied by the cavity is configured to be electrically connected to the low-frequency antenna assembly.

16. An electronic device, comprising:

- a shell;
- a circuit board located in the shell; and
- the antenna system according to claim 1 that is located in the shell and configured to be electrically connected to the circuit board.

* * * * *